(12) United States Patent
Aliaga et al.

(10) Patent No.: US 7,313,285 B2
(45) Date of Patent: Dec. 25, 2007

(54) METHOD AND APPARATUS FOR COMPRESSING AND DECOMPRESSING IMAGES CAPTURED FROM VIEWPOINTS THROUGHOUT N-DIMENSIONAL SPACE

(75) Inventors: Daniel G. Aliaga, Millington, NJ (US); Ingrid Birgitta Carlbom, Summit, NJ (US); Thomas A. Funkhouser, Pennington, NJ (US); Dimah V. Yanovsky, Plainsboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 886 days.

(21) Appl. No.: 10/452,314

(22) Filed: May 30, 2003

(65) Prior Publication Data

US 2004/0240746 A1 Dec. 2, 2004

(51) Int. Cl.
*G06K 9/36* (2006.01)
*G06K 9/46* (2006.01)

(52) U.S. Cl. ............... 382/243; 382/236; 382/238

(58) Field of Classification Search .......... 382/243
See application file for complete search history.

(56) References Cited

U.S. PATENT DOCUMENTS

| | | | | |
|---|---|---|---|---|
| 5,903,673 | A * | 5/1999 | Wang et al. ............... | 382/236 |
| 5,936,671 | A * | 8/1999 | Van Beek et al. ......... | 375/240.14 |
| 6,047,088 | A * | 4/2000 | van Beek et al. ......... | 382/243 |
| 6,097,394 | A | 8/2000 | Levoy et al. | |
| 6,118,474 | A | 9/2000 | Nayar | |
| 6,438,168 | B2 * | 8/2002 | Arye ....................... | 375/240.03 |

OTHER PUBLICATIONS

U.S. Appl. No. 10/452,020, filed May 30, 2003, "Method and System for Creating Interactive Walkthroughs of Real-World Environment from Set of Densely Captured Images".
U.S. Appl. No. 10/452,019, filed May 30, 2003, "Method and Apparatus for Finding Feature Correspondences Between Images Captured in Real-World Environments".
U.S. Appl. No. 10/449,929, filed May 30, 2003, "Method and Apparatus for Computing Error-Bounded Position and Orientation of Panoramic Cameras in Real-World Environments".
U.S. Appl. No. 10/156,189, filed Jun. 29, 2002, "Camera Model and Calibration Procedure for Omnidirectional Paraboloidal Catadioptric Cameras".
U.S. Appl. No. 10/122,337, filed Apr. 16, 2002, "Method and System for Reconstructing 3D Interactive Walkthroughs of Real-World Environments".

(Continued)

*Primary Examiner*—Wenpeng Chen
*Assistant Examiner*—Yuzhen Ge (57) ABSTRACT

Techniques for compressing and decompressing images captured from viewpoints throughout an n-dimensional space. As opposed to conventional approaches, these techniques exploit image coherence over the entire n-dimensional space, providing quick access to images along arbitrary contiguous viewpoint paths during computer graphics applications. This is accomplished by combining a hierarchical data structure with a compression methodology. Such techniques provide for generating and arranging reference images and residual images into a spatial image hierarchy such as a binary tree structure. Images and residuals may be encoded using intra-image compression. A captured image is extracted via a sequence of image warping and addition operations.

33 Claims, 5 Drawing Sheets

OTHER PUBLICATIONS

Shree K. Nayar, "Catadioptric Omnidirectional Camera," IEEE Computer Vision and Pattern Recognition (CVPR '97), 7 pages, 1997.

Henry Fuchs, "On Visible Surface Generation by a Priori Tree Structures," Computer Graphics, Proceedings of SIGGRAPH '890, pp. 124-133, 1980.

B. Triggs et al., "Bundle Adjustment—A Modern Synthesis," Vision Algorithms: Theory and Practice, Springer-Verlag, pp. 1-71, 2000.

J. Shi et al., "Good Features to Track," Proceedings of IEEE on Computer Vision and Pattern Recognition (CVPR94), Seattle, 8 pages, Jun. 1994.

E.H. Adelson et al., "The Plenoptic Function and the Elements of Early Vision," Computational Models of Visual Processing, MIT Press, pp. 1-20, 1991.

M. Levoy et al., "Light Field Rendering," Proceedings of ACM SIGGRAPH 96, pp. 1-12, 1996.

S. Teller et al., "Calibrated, Registered Images of an Extended Urban Area," IEEE Computer Vision and Pattern Recognition (CVPR), pp. 1-20, 2001.

R. Koch et al., "Calibration ofHand-held Camera Sequences for Plenoptic Modeling," IEEE International Conference on Computer Vision (ICCV), 7 pages, 1999.

Camillo J. Taylor, "VideoPlus," IEEE Workshop on Omnidirectional Vision, 8 pages, Jun. 2000.

L.S. Nyland et al., "Capturing, Processing and Rendering Real-World Scenes," Videometrics and Optical Methods for 3D Shape Measurement Techniques, Electronic Imaging Photonics West, vol. 2309, 9 pages, 2001.

* cited by examiner

METHOD AND APPARATUS FOR COMPRESSING AND DECOMPRESSING IMAGES CAPTURED FROM VIEWPOINTS THROUGHOUT N-DIMENSIONAL SPACE

CROSS REFERENCE TO RELATED APPLICATIONS

This application relates to U.S. patent applications identified as Ser. No. 10/449,929 entitled "Method and Apparatus for Computing Error-Bounded Position and Orientation of Panoramic Cameras in Real-world Environments;" Ser. No. 10/452,020 entitled "Method and System for Creating Interactive Walkthroughs of Real-world Environment from Set of Densely Captured Images;" and Ser. No. 10/452,019 entitled "Method and Apparatus for Finding Feature Correspondences Between Images Captured In Real-World Environments," all filed concurrently herewith and commonly assigned, the disclosures of which are incorporated by reference herein.

FIELD OF THE INVENTION

The present invention relates to image compression techniques and, more particularly, to techniques for compression and decompression of images captured from viewpoints throughout n-dimensional space.

BACKGROUND OF THE INVENTION

The ability to capture, store, and reconstruct images of large three-dimensional (3D), real-world environments is becoming increasingly important in a variety of applications, such as interactive walkthroughs, telepresence, and educational tourism. In recent years, the field of image-based rendering (IBR) has attempted to find solutions that enable these applications by capturing large collections of images (i.e., thousands of images). These images are re-sampled to create photorealistic novel views of the environment without necessarily reconstructing a detailed 3D model or simulating global illumination.

For interactive walkthroughs, which are computer graphics applications where an observer moves within a virtual environment, image access cannot be limited to coincide with the viewpoints or paths along which images are captured, but instead requires access along arbitrary contiguous viewpoint paths through the environment. Furthermore, disk-to-memory bandwidth limitations require algorithms that reduce both the size of the images on disk and the amount of data that must be transferred to main memory as an observer navigates through a captured 3D environment.

Image compression techniques, such as JPEG (Joint Photographic Experts Group), two-dimensional (2D) wavelets, and JPEG2000, exploit intra-image redundancy to reduce image size but they do not take advantage of inter-image redundancy. Video compression techniques, such as MPEG (Moving Picture Experts Group), use complex motion-estimation algorithms to exploit inter-image coherence, achieving a significant improvement in overall compression performance. However, motion-estimation is intended for linear sequences of images, making it ill-suited for image access along arbitrary viewpoint paths.

Thus, there exists a need for techniques that overcome the above-mentioned drawbacks by providing improved techniques for compressing and decompressing images of real-world environments.

SUMMARY OF THE INVENTION

The present invention provides techniques for compressing and decompressing images of real-world environments. In one aspect of the invention, a technique for processing images of an environment captured from viewpoints distributed in an n-dimensional space comprises the following steps. A set of nodes is created. Each node contains an original image and the location of the center-of-projection of the image within the environment. Then, a spatial hierarchical data structure is constructed from the nodes using a methodology suitable for image compression.

The original images can be from viewpoints distributed over two-, three-, or higher dimensional space, and also over time. Original images may be represented in the hierarchical data structure as either reference images or residual images.

The technique may further comprise the step of extracting a reconstructed original image from the hierarchical structure via image warping and image addition operations. The extracting step may further comprise the steps of decompressing a reference image and a residual image, warping the reference image to the center-of-projection of the residual image, and adding the warped reference image and the residual image to obtain the extracted image.

Further, the hierarchical data structure constructing step may further comprise generating a residual image from two images. Images used to generate residual images may be an original image or a reconstructed original image. Images used to generate residual images may be warped according to an image correspondence method. Image correspondence may be obtained by a geometric proxy, a globalized set of features, or an optical flow calculation. The residual image generating step may further comprise determining an optimal registration between the two images.

Still further, the step of constructing a hierarchical data structure may further comprise the steps of triangulating the nodes, sequentially collapsing the edges of the triangulation, and placing nodes from the collapsed edge into a binary tree. Each edge may have a priority. The priority of an edge may be computed using an image similarity metric. The image similarity metric may use the distance between the centers-of-projection of the images, the energy of the residual image as an indicator of image similarity, or another suitable metric. The order of the edge collapses may be based on image similarity. The step of building a tree may force some residual images to become reference images. A determining factor of forcing a node to become a reference image may be distance to its reference image or energy of the residual image.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention in the context of an exemplary interactive walkthrough application using image-based rendering techniques. It should be understood, however, that the invention is not necessarily limited to use with any particular rendering algorithm or application. The invention is instead more generally applicable to any algorithm or application in which it is desirable to effectively compress and decompress images for subsequent use.

As will be illustratively explained in detail below, the present invention provides a spatial image hierarchy combined with a compression algorithm. The invention provides quick access to images along arbitrary viewpoint paths during computer graphics applications, such as interactive walkthroughs, and enables efficient compression of high-resolution images irregularly sampled from viewpoints throughout an n-dimensional space.

In an exemplary embodiment of the invention, viewpoints are sampled from a plane (two dimensional space) perpendicular to the ground and approximately at eye-height. The invention may also be used with images captured over a volume of space (three dimensional space) and/or over time (three or four dimensional space). Higher dimensional spaces are also possible.

The techniques of the invention take advantage of the inter-image redundancy over the sampled space by creating a spatial image hierarchy, such as a binary tree, consisting of reference images and residual images. This is conceptually shown in FIG. 1. All images and their residuals are then coded using intra-image compression. In general, an original image is extracted from the hierarchy via a sequence of image warping operations. Each operation warps a reference image to the center-of-projection of a residual image and the two are added together.

Advantageously, the invention is able to compress a large number of high-resolution images of a real-world environment in a manner that yields high compression performance, is highly scalable, and permits fast image access along arbitrary contiguous viewpoint paths. Further, image decoding occurs at interactive rates.

In order to warp images, a mapping is determined from one image to another. The mapping may be obtained by one of several methods that include, but are not limited to, the following: (1) using a geometric proxy of the environment to generate a correspondence between images; (2) calculating a global set of image features as described in the U.S. patent application identified as Ser. No. 10/452,019 entitled "Method and Apparatus for Finding Feature Correspondences Between Images Captured in Real-World Environments," filed concurrently herewith, the disclosure of which is incorporated by reference herein; or (3) using optical flow methods.

While obtaining images to be compressed by the techniques of the invention may be accomplished using a variety of conventional image capture techniques, in a preferred embodiment, images are acquired using the capture subsystem and calibration techniques described in the U.S. patent application identified as Ser. No. 10/122,337 filed on Apr. 16, 2002 and entitled "Method and System for Reconstructing 3D Interactive Walkthroughs of Real-World Environments;" the U.S. patent application identified as Ser. No. 10/156,189 filed on Jun. 29, 2002 and entitled "A Novel Camera Procedure for Omnidirectional Paraboloidal Catadioptric Cameras;" and the U.S. patent application identified as Ser. No. 10/452,020 entitled "Method and System for Creating Interactive Walkthroughs of Real-world Environment from Set of Densely Captured Images," the disclosures of which are incorporated by reference herein. Such capture subsystem and calibration techniques enable image capture from a wide range of dense viewpoints in complex interior environments of unknown geometry. The above-referenced techniques replace the difficult computer vision problems of 3D reconstruction and surface reflectance modeling with the easier problems of motorized cart navigation, dense sampling, and working-set management.

The remainder of the detailed description is divided into the following sections for ease of reference: (I) Compression/Decompression Methodologies; and (II) Illustrative Implementations.

I. Compression/Decompression Methodologies

In general, the present invention generates an image hierarchy, such as a binary tree, that exploits image coherence. This section describes how the tree is built, how images are encoded in the tree, and how images are extracted and decoded. Thus, the illustrative compression methodology of the invention combines an image hierarchy with an image encoding process, while the illustrative decompression methodology of the invention extracts images from the hierarchy and uses an image decoding process to decode the extracted images.

Principles of the inventive techniques will now be generally described below, followed by descriptions of flow charts (in the following section) depicting illustrative steps of the methodologies.

A. Binary Tree Construction

Figure 1:
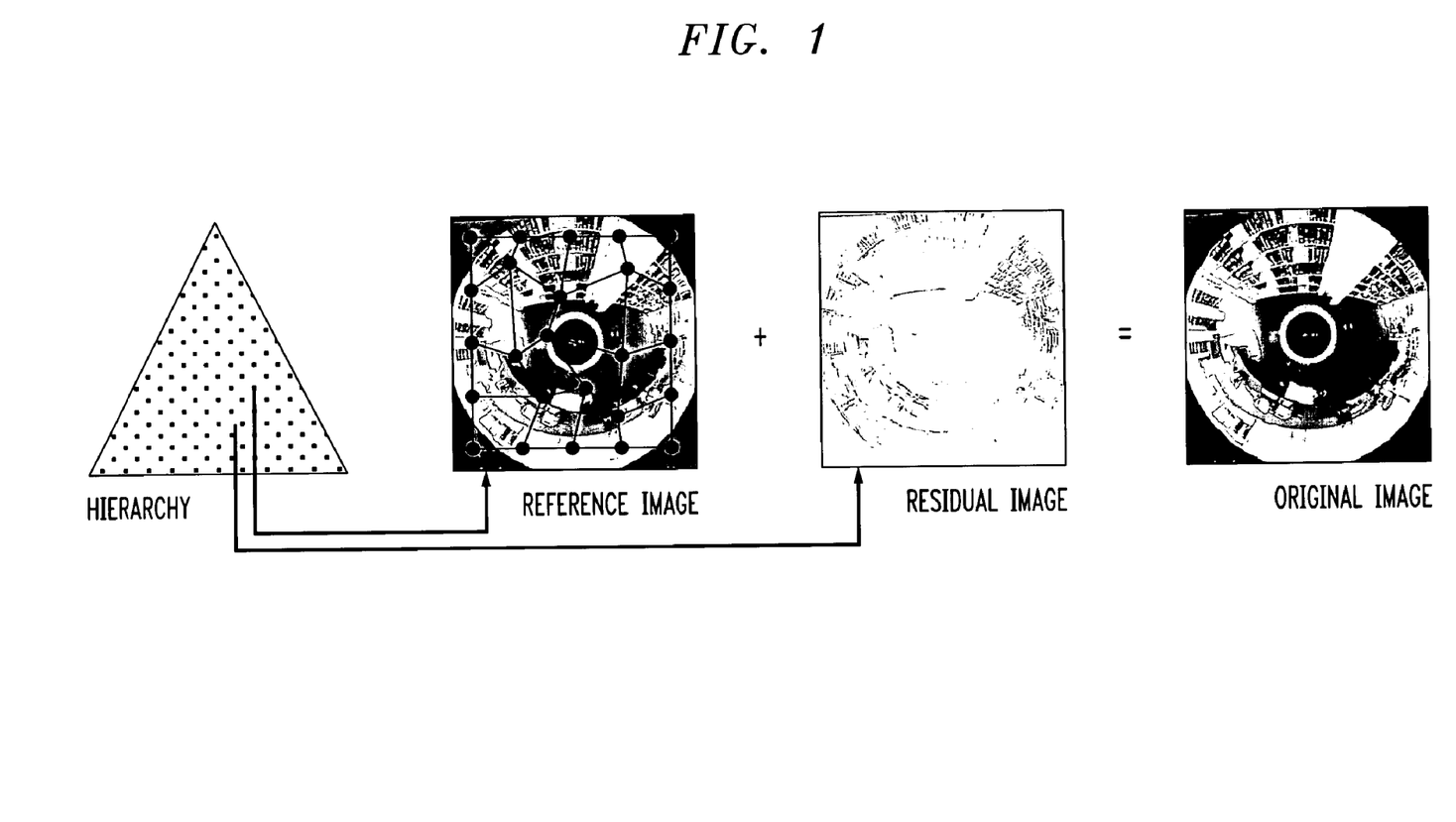
FIG. 1 is a diagram illustrating compression/decompression principles, according to an embodiment of the present invention.

The tree is incrementally built by collapsing the edges of a triangulation of the centers-of-projection (COP) of all the original images (see FIG. 1 for an example). First, a node is created for each image. Second, the edges of the triangulation are placed into a priority queue. Third, the next highest priority edge is collapsed until no more edges remain.

A variety of metrics may be used for edge priority. To maximize compression, edges should be processed in an order that maximizes inter-image coherence. One metric that may be used is the energy of the image residual between the two images of the edge. Image energy may be estimated by calculating the total absolute pixel luminosity of the residual image, by measuring the size of the intra-coded compressed residual image, or another suitable technique that would be clear to one of ordinary skill in the art.

A simpler, but effective, metric is to use the Euclidean distance between the images (i.e., the edge length) as a measure of image similarity. This is based on the assumption that nearby images have greater similarity than those farther apart, and therefore should be processed first. This metric is very fast to evaluate, requiring only a distance calculation, and has been empirically demonstrated to give almost as good a compression performance as the more costly image energy metric.

Using the next highest priority edge and its associated node pair, a half-edge collapse operation is performed in the triangulation and the associated node pair is converted into children of a new common parent node in the hierarchy. This operation produces three types of tree nodes: I-node, P-node, and N-node. An I-node represents a reference image, a P-node represents a residual image, and an N-node represents a so-called placeholder image. The new parent node (I-node) is placed at the same spatial location as one of its children and contains the image formerly stored with that child. The child node at that location (N-node) simply becomes a reference (i.e., placeholder) to the parent. The other child node (P-node) becomes a residual image, the difference between the original child and the I-node image. The I-node image may be optionally warped for better compression, as will be described below. Finally, the nodes are locally re-triangulated and the queue is updated with the new edges, while the edges that no longer exist are removed from the queue. After all edges have been processed, the resulting forest of trees joins to form a single tree for the entire original image set.

Figure 2:
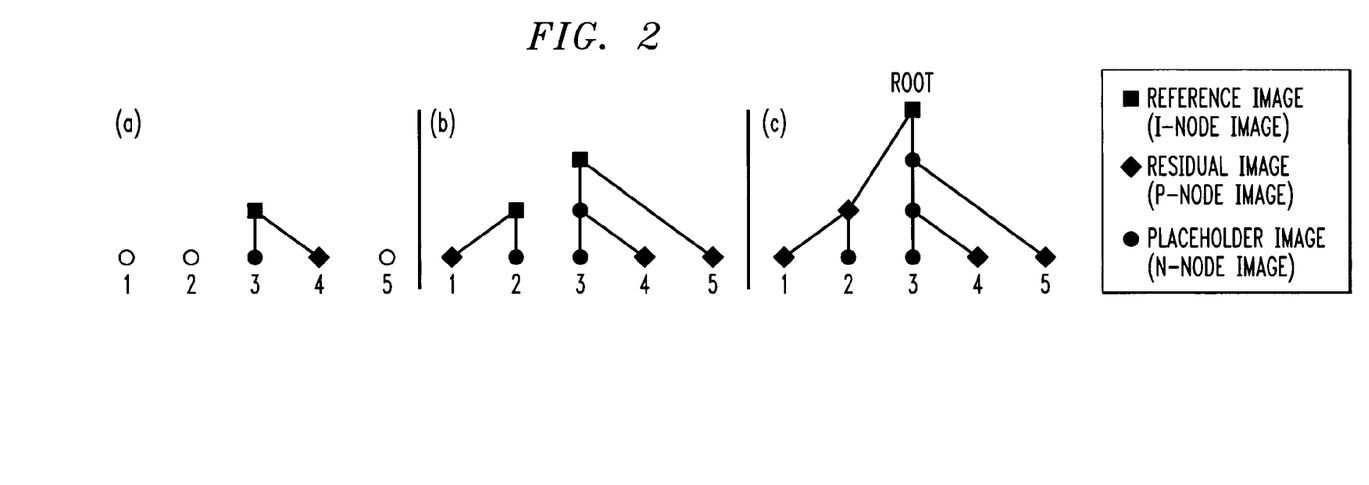
FIGS. 2A through 2C are diagrams illustrating spatial hierarchy generation principles, according to an embodiment of the present invention.

This process is illustrated in FIGS. 2A through 2C, where a tree is built from an initial set of five images (for explanation clarity, although images are captured from a plane, the images are spatially organized along a line). First, the process creates a set of nodes representing each captured image at its viewpoint (FIG. 2A). Then, using a triangulation of the nodes, the next highest priority edge is collapsed, the nodes of the edge endpoints are replaced with a new common parent node (FIG. 2B), and the process is repeated for the remaining edges (FIG. 2C).

B. Image Encoding

The methodology of the invention can use any image encoding process, such as DCT (discrete cosine transform) based compression (e.g., JPEG) or wavelet-based compression for the images at each node in the binary tree. In JPEG, the quality parameter (e.g., a number from 0 to 100) is used to set the amount of quantization, and thus determine the amount of loss. A lower quality value may be selected for residual images, since they contain less information and thus contribute less to overall quality. For instance, quality values of 75 may be used for the reference images and quality values ranging from 40 to 65 may be used for the residual images.

There are several ways to improve compression beyond using residuals based on simple image differencing. One improvement can be achieved by identifying pixel correspondences between the images used in the difference operation and then using this information to lower the energy in the residuals.

A variety of conventional image warping approaches may be used for this purpose. Approaches may be categorized into those that infer pixel correspondences using pixel search algorithms and those that require 3D information of the scene. For example, using per-pixel depth information to warp one image to the center-of projection (COP) of the other reduces the difference between two images. Unfortunately, creating or obtaining an accurate 3D model for a real-world environment can be very difficult.

Motion estimation, typically used in video compression, employs search algorithms to find, for a block of pixels in an image A, a similar block of pixels in an image B. However, such search algorithms can be computationally very expensive.

In an exemplary embodiment, a common set of features may be used to create a correspondence between the images prior to image differencing. The common set of features may be established by using either a coarse polygonal model (proxy) of the environment or by calculating a common set of globalized features. The proxy model can be very easily created and, as described further below, an optimization may then be used to better register the proxy to the images so as to further minimize the image difference. The global set of image features can be obtained through a combination of feature tracking and feature matching operations, as described in the above-referenced Aliaga 6-17-8-3 patent application. Traditional methods, such as optical flow may also be applied to match features.

A feature-based warping methodology may start with a common set of features in both images, triangulate the features in one image, and apply a projective mapping to warp the pixels of each triangle to their corresponding position in the other image. The warp operation may be performed by software or, as a preferred implementation, by exploiting texturing hardware that is commonly available on conventional PC or workstation graphics cards.

When using a geometric proxy, the warping methodology may generate 3D features by subdividing the polygons of the proxy and using the vertices as features. In order to obtain an approximately even distribution of features in image space, the warping methodology adaptively subdivides proxy polygons according to the size of their screen-space projection. Polygons near the COP are subdivided more than polygons farther away.

An alternative method for obtaining a better feature distribution when using a proxy is to use ray casting through an evenly distributed set of 2D features in a first image and finding the corresponding locations in a second image.

For each image differencing operation the registration of the proxy with the images is preferably adjusted so as to minimize the energy of the residual image. This optimization attempts to reduce errors introduced by camera pose estimation as well as attempts to compensate for the approximate nature of the proxy. Camera pose estimation techniques described in the U.S. patent application identified as Ser. No. 10/449,929 filed concurrently herewith and entitled "Method and Apparatus for Computing Error-Bounded Position and Orientation of Panoramic Cameras in Real-world Environments," the disclosure of which is incorporated by reference herein, may be employed.

Such an optimization process may be implemented by using the COP A of a first image $I_A$ and the COP B of a second image $I_B$ to initialize a vector V=B−A, containing the translation and rotation offsets from image $I_A$ to $I_B$. Then, the process minimizes the energy of the residual image between image $I_A$ warped to position A+V and image $I_B$. A multidimensional minimization method such as Powell's method can be used to find an optimal vector V, see for example, W. Press et al., "Numerical Recipes in C," Cambridge University Press, 1999.

C. Image Extraction and Decoding

Figure 3:
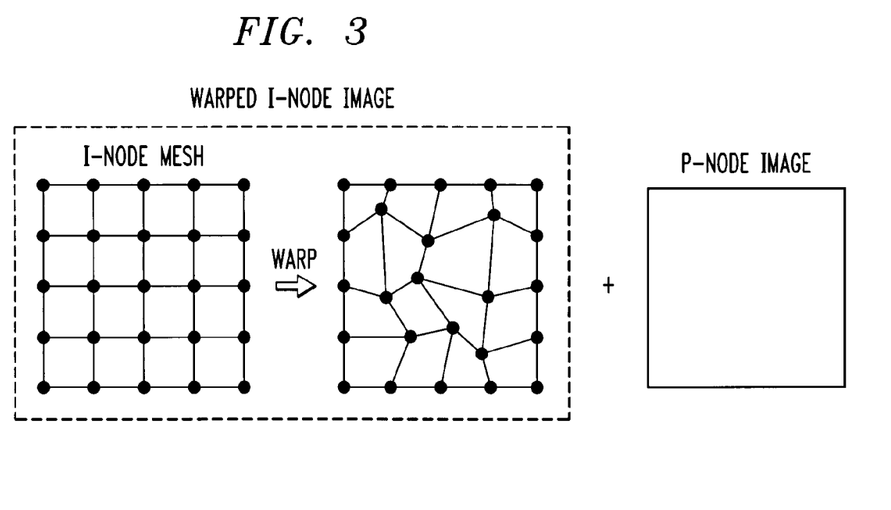
FIG. 3 is a diagram illustrating image warping and extraction principles, according to an embodiment of the present invention.

A typical interactive walkthrough application requires access to images along arbitrary contiguous paths through an environment of M images. FIG. 3 illustrates the basic process for extracting one arbitrary image from the tree.

First, the corresponding leaf node is found, and the links are traced up to the I-node ancestor. Then, starting with the I-node, the path is reversed following the P-node or N-node branches, adding the P-node images to the I-node until the leaf-node is reached. This procedure is applied recursively until the tree is traversed down to the node of the desired image.

There are several variants to the tree building process that yield different image-extraction methods. Three illustrative methods are described below.

The first extraction method is the most straightforward and requires at most an O(logM) sequence of image additions. The root of the tree is the only I-node and all other nodes are either P-nodes or N-nodes. Since the root I-node must be accessed, the number of image additions required to extract an arbitrary image is proportional to the height of the tree.

Unfortunately, the accumulation of a long sequence of incremental image residuals may result in a large reconstruction error. This problem can be mediated by creating residual images top-down instead of bottom-up, ensuring that only original images are used to calculate image residuals. In order to create residual images top-down, a tree skeleton must first be created, i.e., the node types and the tree connectivity must be determined. Such a tree skeleton can be easily constructed if a metric for edge collapse priority depends on the Euclidean distance between the images is used.

The second extraction method reduces decompression time, at the expense of storage, by decreasing the maximum number of image additions. This option forces I-nodes to be distributed throughout the tree, akin to forced intra-coding in MPEG. This distribution may be proportional to the residual image energy (adaptive) or set by a pre-defined constant. For example, if during an edge collapse it is determined that the residual image energy is greater than a pre-defined threshold or the distance between a newly created I-node and the farthest P-node descendant is greater than a pre-defined constant, the newly created P-node is changed to an I-node.

The third image extraction method further reduces the number of image additions to exactly one in all cases (i.e., constant time) by defining the residual image of a P-node directly relative to the closest I-node up the tree. To build such a tree, a priori knowledge of which nodes will be I-nodes must be available or residual images must be created after creating the tree skeleton.

II. Illustrative Implementations

Given the above detailed description of compression/decompression principles of the present invention, descriptions of flow charts depicting illustrative steps of such methodologies will now be provided.

Figure 4:
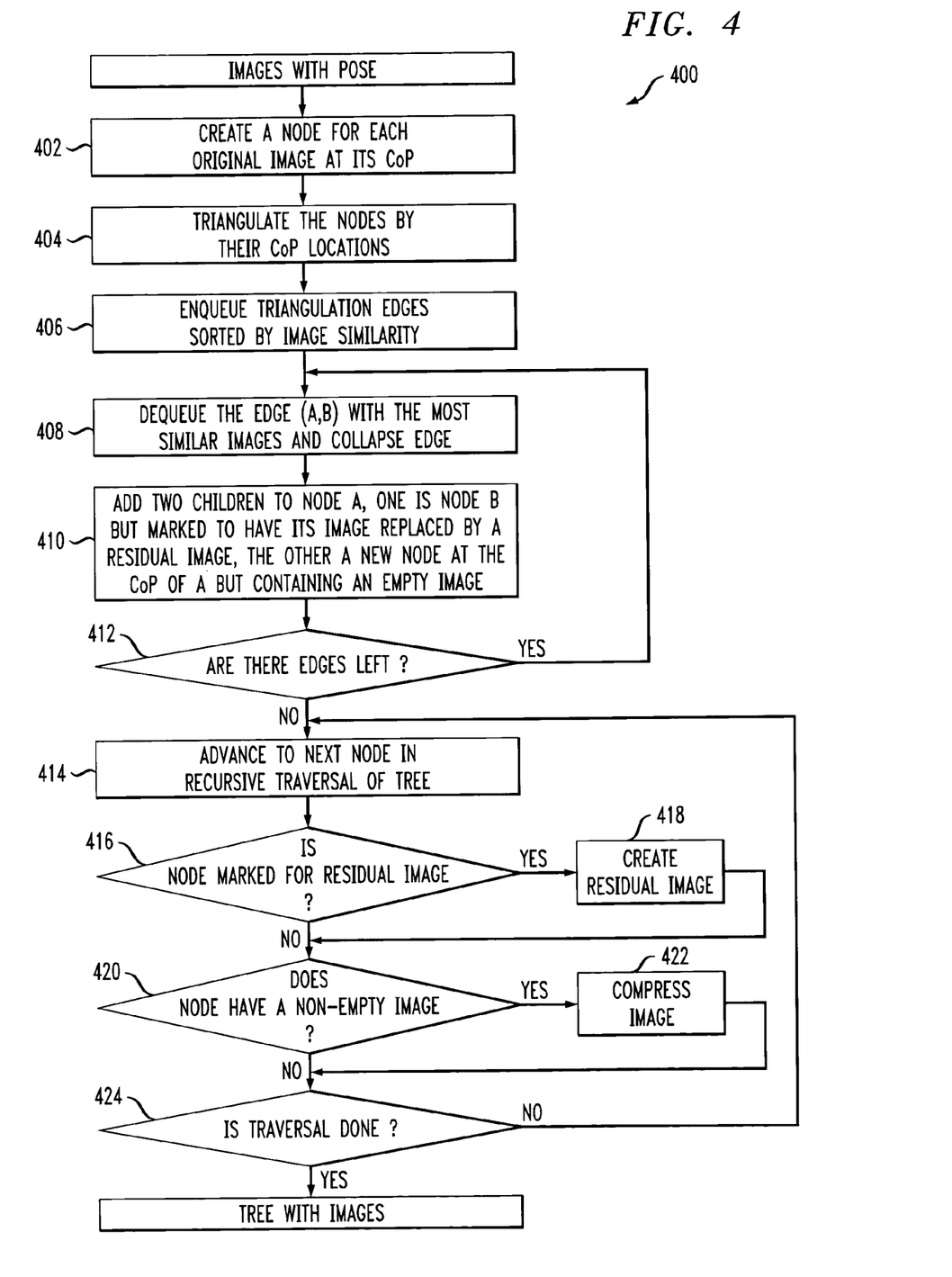
FIG. 4 is a flow diagram illustrating a compression methodology, according to an embodiment of the present invention.

Referring now to FIG. 4, a flow diagram illustrates an image compression methodology, according to an embodiment of the present invention.

As shown, image compression methodology 400 begins, in step 402, by creating a tree node for each original image. This node contains the image and a vector representing the world-space position of the center-of-projection (COP) of the image.

In step 404, a data structure associating pairs of nodes is then created. By way of example, this data structure may create all possible pairs or only create pairs between adjacent nodes. In a preferred implementation, as mentioned above, a triangulation of the nodes is created, wherein each edge associates two nearby nodes.

In step 406, the pairs of nodes are placed into a priority queue. The priority is computed by an image similarity metric. By way of example and as mentioned above, the edges of the triangulation are inserted into the queue and the metric is either edge length in accordance with Euclidian distance measure (i.e., the images closest to each other are assumed to be the most similar) or difference image energy (i.e., subtract the images from each other and use the energy of the resulting difference image as an indication of their similarity).

In step 408, the methodology iteratively dequeues the next pair AB, representing the next most similar image pair to collapse. By way of example, the methodology collapses the edge AB within the triangulation, and updates the triangulation. This update may cause some new edges to be added to the queue and some previous edges to be removed.

In step 410, the node hierarchy is also updated to reflect the collapse of the node pair. One of the nodes of the dequeued edge (B) is made a child of the other node (A). Further, node B is marked to have its image replaced by a residual image (also known as a "difference image"). Also, a new node is created with the same COP as A, but with an empty image. This node is made the second child of node A.

This process repeats until there are no more pairs (or edges) to collapse, as determined in accordance with step 412.

The next step is to compute the residual images missing in the tree. For this, the tree is recursively traversed in accordance with step 414.

In accordance with steps 416, 418, 420 and 422, the following operations occur. Some nodes have empty images, some have original images, and some have original images but are marked to have their image replaced with a residual image. All residual images for a given hierarchy are built (step 418) and all images themselves are compressed (step 422). Once all nodes of the hierarchy have been processed, the complete compression tree is outputted.

Once the recursive traversal is done (i.e., all nodes have been visited), as determined in accordance with step 424, the compression process is complete.

Figure 5:
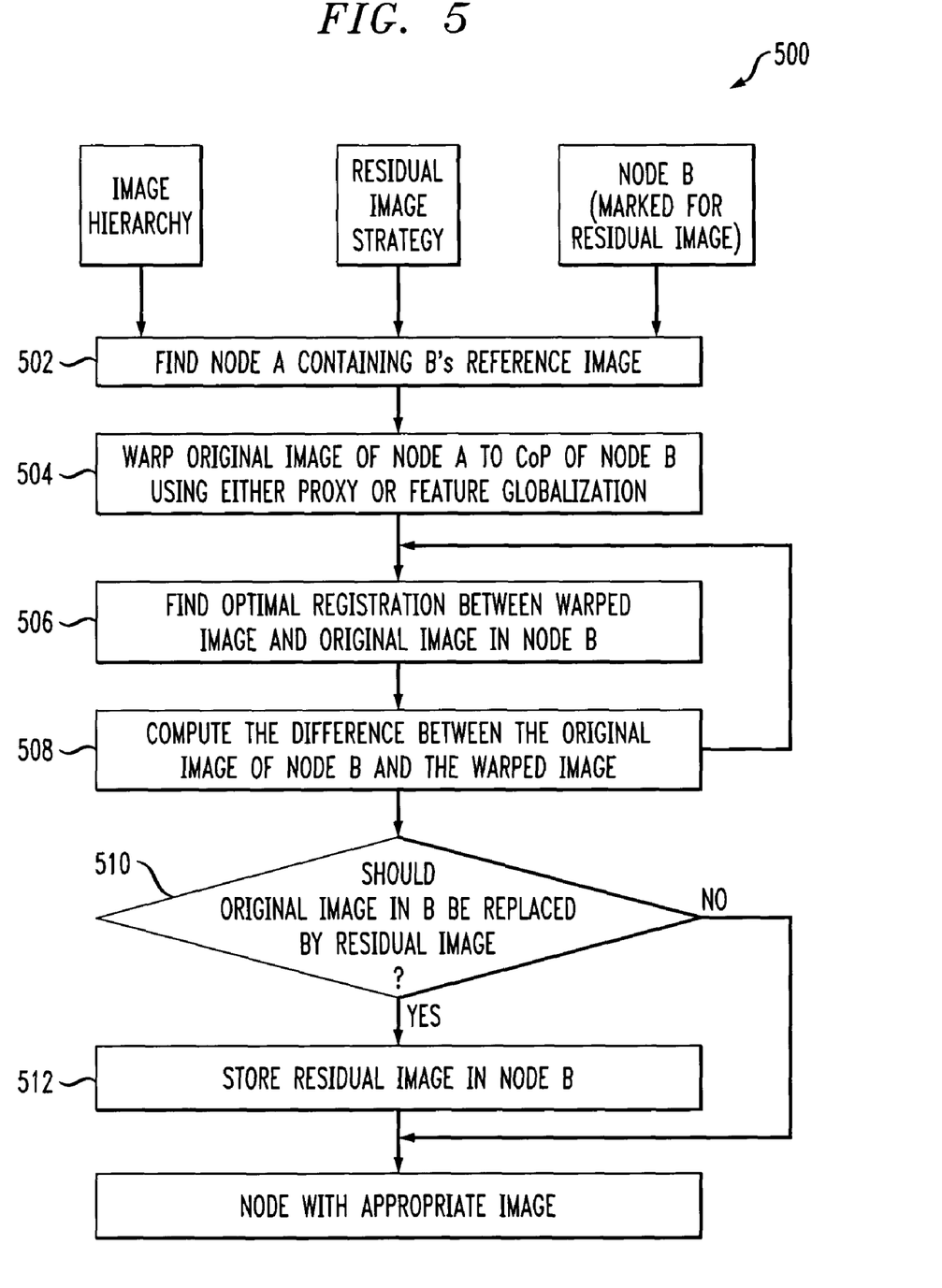
FIG. 5 is a flow diagram illustrating a residual image generation methodology, according to an embodiment of the present invention.

Referring now to FIG. 5, a flow diagram illustrates a residual image generation methodology, according to an embodiment of the present invention. It is to be appreciated that such a methodology may be implemented in the image compression methodology of FIG. 4 at step 418.

As shown, methodology 500 begins, in step 502, by finding the reference image of the desired residual image node. By way of example, there are multiple strategies for choosing a reference image, for example: (a) the reference image can be the immediate ancestor of the residual image (thus can be either another residual image or an original image); or (b) the reference image can be an original image some levels up the tree. The former strategy compresses better but implies more images must be accessed to decode a single image. The latter strategy has a potentially faster decoding time but does not compress the image set as well.

In step 504, the reference image is warped to the COP of the residual image node. By way of example, as mentioned above, warping can be performed using either a proxy or globalized features.

In step 506, an optimization procedure may be used to find the optimal registration of the images to the proxy (or features) so as to reduce the energy of the residual image. By way of example, a preferred implementation provides for rotating and translating image A relative to image B so as to minimize the difference between image A, warped to image B, and image B.

In step 508, the warped reference image is subtracted from the original image of the residual image node. By way of example, this operation may be efficiently done using conventional graphics hardware (e.g., either multi-texturing features or accumulation buffer operations).

The methodology, in accordance with step 510, may decide that some nodes should not be converted to residual images. By way of example, if the residual image has high energy or the closest reference image is too far from the residual image, the original node may not be changed to contain a residual image.

Lastly, in step 512, the accepted residual images are stored with each node.

Figure 6:
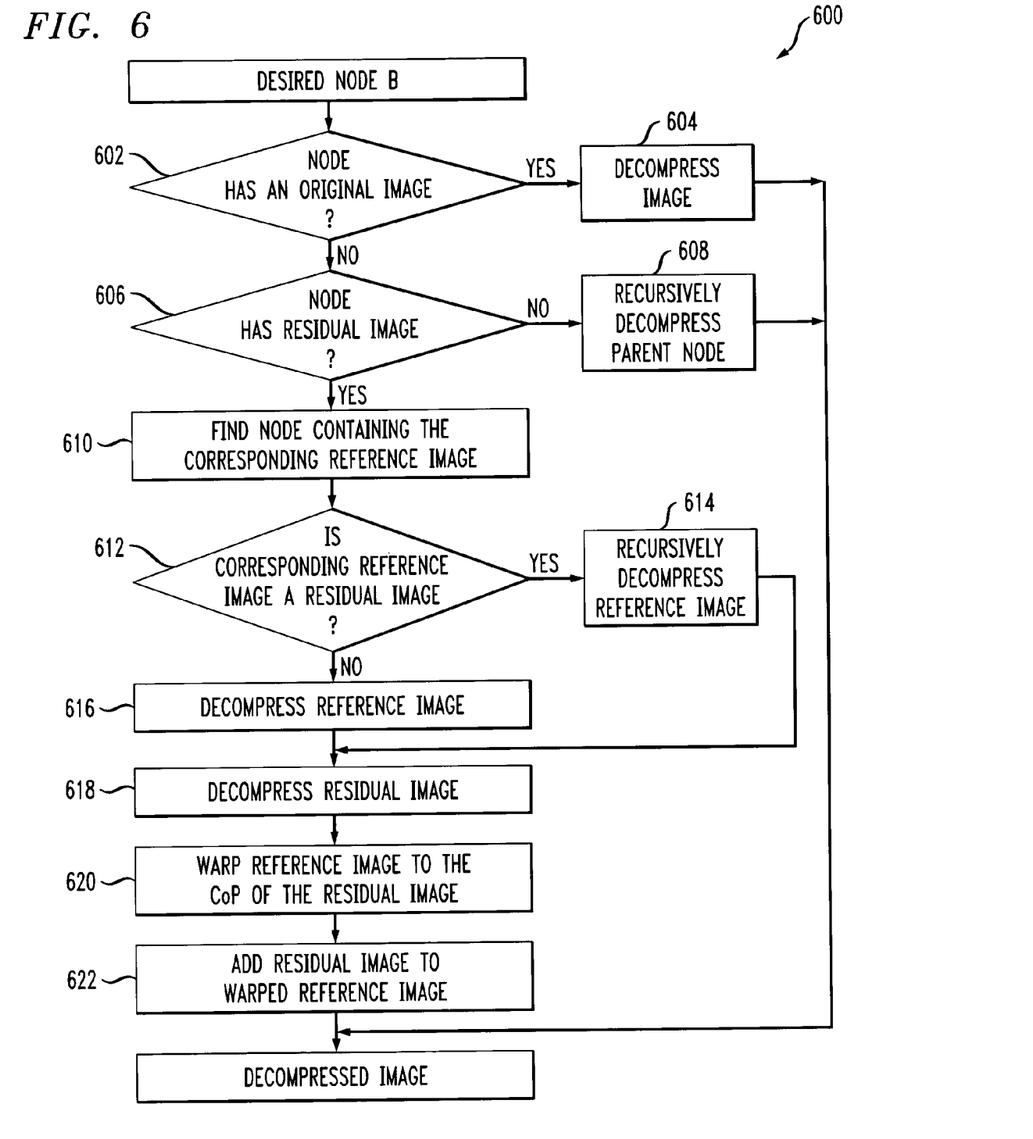
FIG. 6 is a flow diagram illustrating a decompression methodology, according to an embodiment of the present invention.

Referring now to FIG. 6, a flow diagram illustrates an image decompression methodology, according to an embodiment of the present invention.

As shown, in accordance with steps 602 and 604 of image decompression methodology 600, if the node to decompress already has an original image stored, then that image is decompressed, and the process is complete.

In accordance with steps 606 and 608, if the node does not have an original image or a residual image (i.e., it must be an empty image), then the methodology recursively decompresses the parent node (which has the same COP). The process is then complete.

In accordance with step 610, if the node has a residual image, then the methodology finds the corresponding reference image up the tree. By way of example, there are multiple strategies for choosing a reference image, for example: (a) the reference image can be the immediate ancestor of the residual image (thus can be either another residual image or an original image); or (b) the reference image can be an original image some levels up the tree.

In accordance with steps 612 and 614, if the reference image is a residual image, then it is recursively decompressed as well.

In step 616, if the reference image is an original image, then it is simply decompressed.

In step 618, the residual image itself is decompressed.

In step 620, the reference image is warped to the COP of the residual image node. By way of example, as mentioned above, warping can be performed using either a proxy or globalized features.

Lastly, in step 622, these two images are added together to produce the new decompressed final image.

By way of example only, an implementation used to realize principles of the present invention will now be described. The above-described inventive algorithms were implemented in C/C++ on a SGI Onyx2 MIPS 250 MHz system equipped with InfiniteReality graphics subsystem and on a PC Pentium IV 1.7 MHz system equipped with a NVidia GeForce3 Ti 500 graphics card. JPEG compression was used both for the I-nodes and P-nodes, adjusting the quality setting to achieve the desired quantization.

An OpenGL programming interface and the graphics subsystem was used to achieve image differencing and image addition at interactive rates. On the SGI system, image differencing and image addition operations may be performed using the accumulation buffer. On the PC system, both operations may be performed using multiple-pass texture mapping operations.

Image warping was also implemented using OpenGL. To determine the set of features for reconstructing an image using an I-node and P-node image pair, proxy polygons were recursively subdivided on the main CPU for the COP of either of the images. Using a low-resolution frame buffer, the proxy polygons were rendered into the z-buffer and then the proxy vertices were rendered into the color buffer encoding unique vertex IDs in the color channels. Next, the frame buffer was read back, and it was determined which vertices were visible. The location of the same features in the other image was computed. Next, the two images were loaded into texture memory. A triangular mesh was rendered for the I-node image using its feature positions in image space as texture coordinates, but the mesh was rendered using the vertex coordinates of the P-node mesh to create the warped image. Finally, the reconstructed image was obtained by adding the signed P-node residual image to the warped I-node image.

The complexity of the image warp operation is proportional to the size of the images. In order to reduce the complexity, the size of the warped images can be reduced. This reduction in image resolution improves runtime performance but shifts more energy into the residual image.

Figure 7:
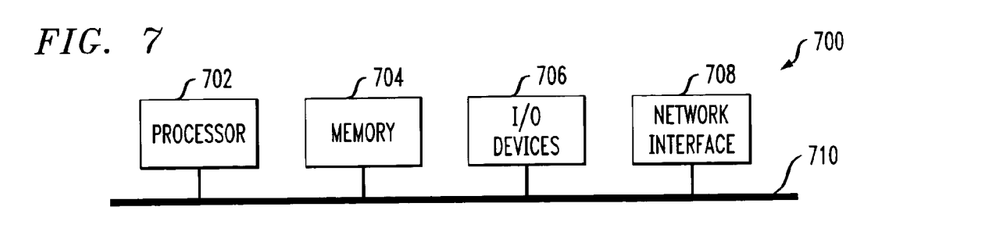
FIG. 7 is a block diagram illustrating a generalized hardware architecture of a computer system suitable for implementing one or more functional components of a compression/decompression system, according to an embodiment of the present invention.

Referring finally to FIG. 7, a block diagram illustrates a generalized hardware architecture of a computer system suitable for implementing one or more of the functional components/steps of compression/decompression methodologies as depicted in the figures and explained in detail herein. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network. Also, the components/steps of the invention may be implemented in a client/server architecture. Thus, the computer system depicted in FIG. 7 represents a client device or a server.

As shown, the computer system 700 may be implemented in accordance with a processor 702, a memory 704, I/O devices 706, and a network interface 708, coupled via a computer bus 710 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., cameras, keyboards, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of processing images of an environment captured from viewpoints distributed in an n-dimensional space, comprising the steps of:
   creating a set of nodes, each node containing an original image and a location of the center-of-projection of the image within the environment, and
   constructing a spatial hierarchical data structure from the nodes using an image compression methodology, wherein the step of constructing a hierarchical data structure further comprises the steps of:
   triangulating the nodes;
   sequentially collapsing the edges of the triangulation; and
   placing a node from the collapsed edge into a binary tree.

2. The method of claim 1, wherein the n-dimensional space may include two-, three-, or higher-dimensional Euclidian space, and time.

3. The method of claim 1, wherein original images are represented in the hierarchical data structure as either reference images or residual images.

4. The method of claim 3, wherein the hierarchical data structure constructing step further comprises generating a residual image from two images.

5. The method of claim 4, wherein images used to generate residual images include any combination of original images and reconstructed original images.

6. The method of claim 4, wherein images used to generate residual images are warped according to an image correspondence method.

7. The method of claim 6, wherein image correspondence may be obtained by at least one of a geometric proxy, a globalized set of features, or an optical flow calculation.

8. The method of claim 3, wherein the residual image generating step further comprises determining an optimal registration between the two images.

9. The method of claim 1, further comprising the step of extracting a reconstructed original image from the hierarchical structure via image warping and image addition operations.

10. The method of claim 9 wherein the extracting step further comprises the steps of:
    decompressing a reference image and a residual image;
    warping the reference image to the center-of-projection of the residual image; and
    adding the warped reference image and the residual image to obtain the extracted image.

11. The method of claim 1, wherein each edge has a priority.

12. The method of claim 11, wherein the priority of an edge is computed using an image similarity metric.

13. The method of claim 12, wherein the image similarity metric uses one of the distance between the centers-of-projection of the images and the energy of the residual image as an indicator of image similarity.

14. The method of claim 1, wherein the order of the edge collapses is based on image similarity.

15. The method of claim 1, wherein the step of building a tree may force some residual images to become reference images.

16. The method of claim 15, wherein a determining factor of forcing a node to become a reference image may be one of distance to its reference image and energy of the residual image.

17. Apparatus for processing images of an environment captured from viewpoints distributed in an n-dimensional space, comprising:
    a memory; and
    at least one processor coupled to the memory and operative to: (i) create a set of nodes, each node containing an original image and a location of the center-of-projection of the image within the environment, and (ii) construct a spatial hierarchical data structure from the nodes using an image compression methodology, wherein the operation of constructing a hierarchical data structure further comprises:
    triangulating the nodes;
    sequentially collapsing the edges of the triangulation; and
    placing a node from the collapsed edge into a binary tree.

18. The apparatus of claim 17, wherein the n-dimensional space may include two-, three-, or higher-dimensional Euclidian space, and time.

19. The apparatus of claim 17, wherein original images are represented in the hierarchical data structure as either reference images or residual images.

20. The apparatus of claim 19, wherein the hierarchical data structure constructing operation further comprises generating a residual image from two images.

21. The apparatus of claim 20, wherein images used to generate residual images include any combination of original images and reconstructed original images.

22. The apparatus of claim 20, wherein images used to generate residual images are warped according to an image correspondence method.

23. The apparatus of claim 22, wherein image correspondence maybe obtained by at least one of a geometric proxy, a globalized set of features, or an optical flow calculation.

24. The apparatus of claim 19, wherein the residual image generating operation further comprises determining an optimal registration between the two images.

25. The apparatus of claim 17, wherein the at least one processor is further operative to extract a reconstructed original image from the hierarchical structure via image warping and image addition operations.

26. The apparatus of claim 25 wherein the extracting operation further comprises:
    decompressing a reference image and a residual image;
    warping the reference image to the center-of-projection of the residual image; and
    adding the warped reference image and the residual image to obtain the extracted image.

27. The apparatus of claim 17, wherein each edge has a priority.

28. The apparatus of claim 27, wherein the priority of an edge is computed using an image similarity metric.

29. The apparatus of claim 28, wherein the image similarity metric uses one of the distance between the centers-of-projection of the images and the energy of the residual image as an indicator of image similarity.

30. The apparatus of claim 17, wherein the order of the edge collapses is based on image similarity.

31. The apparatus of claim 17, wherein the operation of building a tree may force some residual images to become reference images.

32. The apparatus of claim 31, wherein a determining factor of forcing a node to become a reference image may be one of distance to its reference image and energy of the residual image.

33. An article of manufacture for processing images of an environment captured from viewpoints distributed in an n-dimensional space, comprising a computer readable medium having one or more stored computer programs which when executed implement the steps of:

creating a set of nodes, each node containing an original image and a location of the center-of-projection of the image within the environment, and constructing a spatial hierarchical data structure from the nodes using an image compression methodology, wherein the step of constructing a hierarchical data structure further comprises the steps of:

triangulating the nodes;

sequentially collapsing the edges of the triangulation; and placing a node from the collapsed edge into a binary tree.

* * * * *

UNITED STATES PATENT AND TRADEMARK OFFICE
CERTIFICATE OF CORRECTION

PATENT NO. : 7,313,285 B2
APPLICATION NO. : 10/452314
DATED : December 25, 2007
INVENTOR(S) : D. G. Aliaga et al.

It is certified that error appears in the above-identified patent and that said Letters Patent is hereby corrected as shown below:

In the specification:

Column 6, line 17, please delete "Aliaga 6-17-8-3" and insert --10/452,020--.

Signed and Sealed this

Twenty-ninth Day of April, 2008

JON W. DUDAS
*Director of the United States Patent and Trademark Office*